United States Patent [19]

Reale

[11] 4,221,239
[45] Sep. 9, 1980

[54] INSULATED CONDUIT

[75] Inventor: Salvatore Reale, Preston, Md.

[73] Assignee: Sunergy Corporation, Preston, Md.

[21] Appl. No.: 32,490

[22] Filed: Apr. 23, 1979

Related U.S. Application Data

[63] Continuation-in-part of Ser. No. 886,243, Mar. 13, 1978, abandoned.

[51] Int. Cl.³ .................. F16L 9/22; F16L 51/00; F16L 9/14
[52] U.S. Cl. .................. 138/149; 138/108; 138/155; 138/113; 138/114; 285/47; 285/403; 285/425
[58] Field of Search .......... 138/103, 105, 108, 111, 138/113, 114, 115, 148, 149, 155, 172, 178; 285/18, 27, 28, 31, 47, 93, 131, 399, 403, 425

[56] References Cited

U.S. PATENT DOCUMENTS

| | | | |
|---|---|---|---|
| 340,691 | 4/1886 | Aldrich | 138/113 |
| 1,160,202 | 11/1915 | Scherer | 285/403 X |
| 1,584,926 | 5/1926 | Hale | 285/403 |
| 1,931,465 | 10/1933 | Gysling | 138/113 |
| 1,989,926 | 2/1935 | Hoover et al. | 138/145 |
| 2,494,803 | 1/1950 | Frost et al. | 138/114 X |
| 2,857,648 | 10/1958 | March | 138/113 X |
| 3,402,731 | 9/1968 | Martin | 285/47 X |
| 3,563,825 | 2/1971 | Segura et al. | 138/149 |
| 3,583,732 | 6/1971 | Dennis et al. | 285/425 X |
| 3,692,207 | 9/1972 | Vayson de Pradenne | 138/113 X |
| 3,825,286 | 7/1974 | Henry | 285/93 |
| 3,850,453 | 11/1974 | Bentley et al. | 285/47 |
| 3,885,595 | 5/1975 | Gibson et al. | 285/47 X |
| 3,891,006 | 6/1975 | Lee | 285/47 X |
| 3,952,777 | 4/1976 | Uhlig | 138/113 |

FOREIGN PATENT DOCUMENTS

| | | | |
|---|---|---|---|
| 852544 | 2/1940 | France | 285/425 |
| 1337394 | 11/1973 | United Kingdom | 285/47 |

Primary Examiner—James E. Bryant, III

[57] ABSTRACT

An insulated conduit composed of an inner structural tubing with each length or bend of said tubing having a bell socket at one end with a matching spigot joint at the other end, and so arranged that one is enabled to assemble comparitively long continuous lengths of the insulated conduit. Resting blocks are placed at appropriate position and distances within the inner structural tubing whereby energy carrying piping may be inserted within the inner structural tubing and rest upon said blocks. The energy carrying piping is protected from loss of heat energy by the insulative value of the ambient air within the inner structural tubing and also by the inclusion of inert air spaces located between a series of structural ribs which form a support between the inner structural tubing and an outer insulation jacket.

The outer insulation jacket having annular tongue and groove matching configurations at the ends combined with a system of wire anchors which are incorporated for making easily formed joints being moisture resistant and thus protecting the inner energy carrying piping from corrosion and heat loss. The use of a binding material such as wire is employed to hold continuous lengths of the insulated conduit together during installation.

1 Claim, 11 Drawing Figures

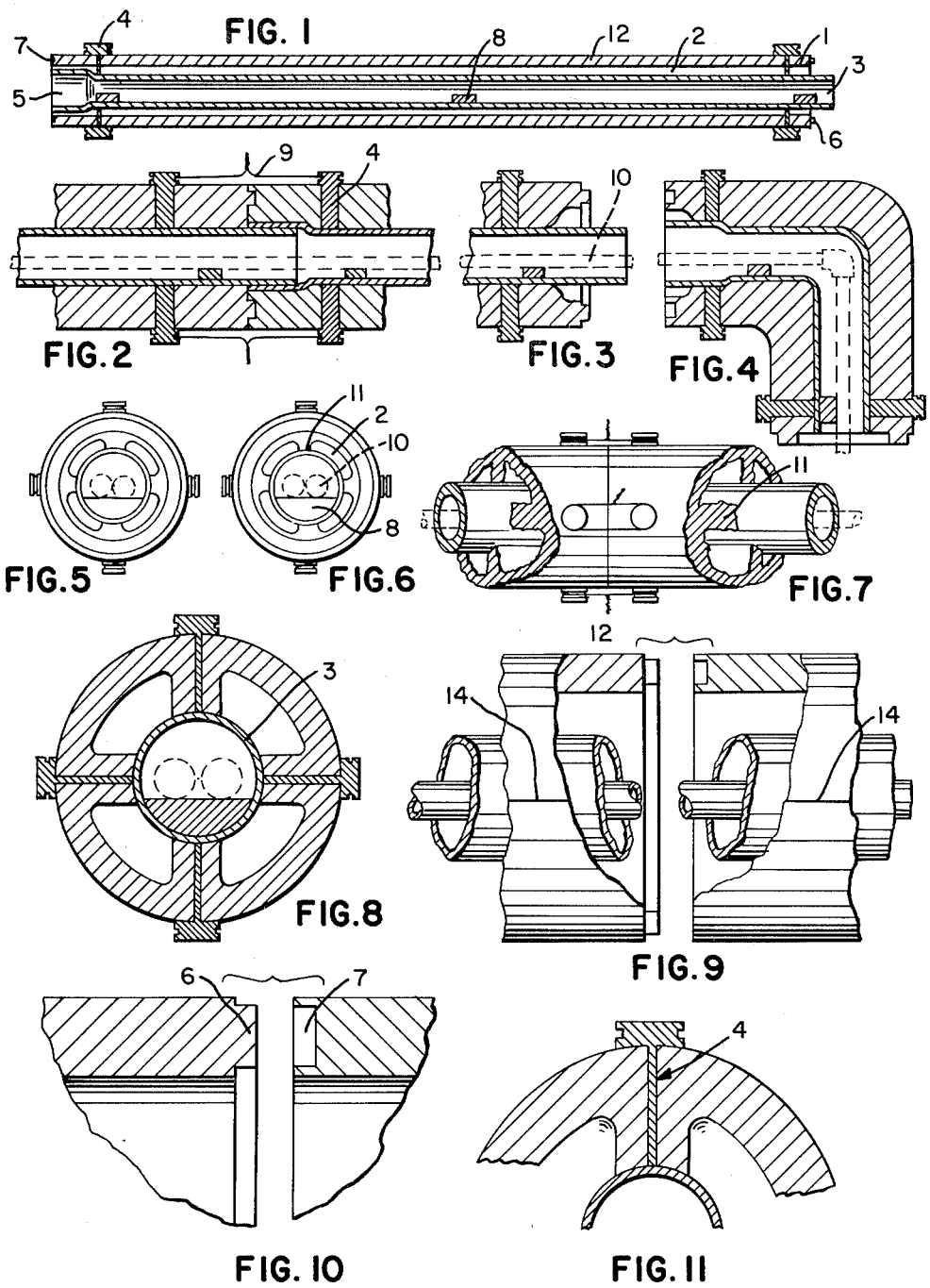

INSULATED CONDUIT

This application is a continuation-in-part of application Ser. No. 886,243 filed Mar. 13, 1978, now abandoned.

BRIEF SUMMARY OF THE INVENTION

There is a need in manufacturing installations, farms, homes, experimental laboratories, governmental installations, solar energy utilization for a comparitively simplified means of providing insulation and protection from the elements for heat, cold or any piping conveying liquid or gaseous materials from one point to another. This system allows the user the option of the installation of a wide variety of piping of various construction and materials without the necessity of purchasing the piping and insulation as a combined unit. An easily installed slide-over arrangement allows for simplified testing of the installation for leakage and provides adequate facilities for expansive forces while undergoing wide variations in temperature. This system is particularly effective and adaptable but not necessarily restricted to subterranean installations where the installation is in direct earth contact. Use of the insulated conduit makes the installation of underground piping in open earth excavations simpler and offers better protection from moisture and penetration by vapor and allows greater economic savings during fabrication and installation of protection for piping than what is presently available. Undesired heat loss is kept to a minimum by providing a unique vapor and insulative protection. The insulated conduit provides a high degree of structural stability, thus offering protection during installation procedures.

BRIEF DESCRIPTION OF THE VIEWS OF THE DRAWING

FIG. 1 is a cross section of a length of insulated conduit.

FIG. 2 is a cross section of a joint comprised of two individual sections of insulated conduit.

FIG. 3 is the spigot end of a length of insulated conduit in cross section.

FIG. 4 is a cross section of a 90 degree bend in insulated conduit.

FIG. 5 is and end view of the spigot end of a section of insulated conduit.

FIG. 6 is an end view of the bell end of a section of insulated conduit.

FIG. 7 is a side view of a joint of two separate lengths of insulated conduit.

FIG. 8 is a cross section of insulated conduit taken through a resting block.

FIG. 9 is a side view with cutaways and a partial section of two lengths of insulated conduit.

FIG. 10 is a partial view of the annular joint in two sections of insulated conduit.

FIG. 11 is a cross section view of an anchor arrangement.

DETAILED DESCRIPTION

FIG. 1 is a section of a length of insulated conduit taken slightly off the circular axis of the conduit. By this means the dead air space 2, is shown and a cross section of the outer wall of the outer insulation jacket 1. The inner structural tubing is shown at the spigot end 3, with the protrusion of the spigot end of the inner structural tube a distance from the plane inscribed by the end of the outer insulation jacket, the length of said distance being determined by the depth 13, of the bell end of the adjoining inner structural tubing. The bell end 5, of the inner structural tube lying in the same plane as the one formed by the circumference of the outer insulation jacket. The outer insulation jacket having an annular tongue configuration 6, at one end and a matching annular groove arrangement configuration 7, at the other end. Said inner structural tubing being constructed of a homogenous, water resistant material such as, but not restricted to poly vinyl chloride plastic tubing which is ordinarily manufactured with accomodating bell and spigot ends so the spigot end of one length may be inserted a certain distance into the bell end of an adjacent length of tubing. The outer insulation jacket 1, being composed of a material such as but not necessarily restricted to an expandable foam type plastic such as styrofoam, urethane, or expanded polystyrene. The ribs, 11 also being composed of said materials and being arranged in a desired manner shape thereby forming the so called dead air space between the inner structural tubing and the outer insulation jacket with the dead air space, 2 formed by the rib arrangement and running the length of the insulated conduit. Said outer insulation jacket is further protected by a membrane, 12 of a relatively moisture or vapor penetrative resistant material such as, but not necessarily restricted to a plastic type material of these characteristics such as tubular polyethylene film. Resting blocks, 8 are provided for support and a resting surface for the inner heat or energy conducting piping 10, and may be constructed of a low friction type material thereby allowing said energy conducting piping freedom of linear motion as required during expansive and contractive variations caused during the transfer of materials or energy. Anchors, 4 composed of appropriate material are fastened by suitable means and at ideal intervals and distances from the individual ends of each section of insulated conduit and thereby provide a means of attachment of a wire, thong or similar material, 9 so adjoining sections may be fastened to each other and held in close approximation in this manner. Linear marking lines, 14 are provided so each section may be assembled in a proscribed circumferential arrangement with the adjoining section thereby assuring alignment of the interior resting blocks.

I claim:
1. An insulated conduit comprising:
   (a) a section of tubing a series of resting blocks suitable for resting piping upon with said blocks contained within said section of tubing,
   (b) said tubing composed of suitable material with structural and homogenous integrity and having a matching configuration or means of adjoining or attachment to adjoining tubing through the use of a bell configuration at one end and an insertable spigot configuration at the other end which may be inserted into said bell end of an adjoining tube a certain distance,
   (c) an outer insulation jacket a series of ribs acting as spacers between said tube and said outer insulation jacket thereby providing an added means of structural stability to the assembly an by which means a dead air space is provided,
   (d) a series of dead air spaces located between said ribbed arrangement thereby providing insulative value between said inner structural tubing and outer insulation jacket, (e) an arrangement of anchors suitably placed and attached in an appropriate position and manner, thereby providing a means for attachment of a wire or other suitable binding material which may be utilized for the purpose of holding adjoining sections of insulated conduit together, (f) an outer membrane or covering shielding the outside surface or perimeter of entire assembly of insulated conduit from penetration by moisture or transient moisture bearing vapors, (g) an annular groove configuration located at one end of the outer insulation jacket allowing the joining of a matching tongue arrangement of the adjacent section of insulated conduit, (h) an annular tongue configuration located at one end of the outer insulation jacket allowing the joining of a matching groove arrangement of the adjacent section of insulated conduit, (i) a linear marking line arrangement visually or otherwise apparent whereby each section of insulated conduit may be assembled in a predetermined manner and thereby providing provision that the said resting blocks will be aligned in a suitable manner during fabrication and installation of individual sections of insulated conduit one with another, (j) said spigot end of the inner structural tubing extends a certain distance from the area of the plane formed by the end circumference of the outer insulation jacket, with this certain distance being determined by the length of the spigot end of the inner structural tubing to be inserted into the bell end of the adjoining inner structural tubing sufficient in penetration to make a sound joint before contact between the annular tongue and groove arrangement of the outer insulation jacket occurs, (k) wire means or other suitable binding material to be used for holding together adjoining sections of insulated conduit by means of attachment of or the wrapping of said material around anchors fastened to the insulated conduit, (l) installation means for said piping within said inner structural tubing with said piping having the capabilities of conducting energy from one point to another or for the transmission of liquids or gaseous elements.

* * * * *